United States Patent [19]

Crawford et al.

[11] 4,263,051
[45] Apr. 21, 1981

[54] SOFT-SETTLING SILICA FLATTING AGENT

[75] Inventors: Roger A. Crawford; Hubert J. Golden, both of Wadsworth, Ohio

[73] Assignee: PPG Industries, Inc., Pittsburgh, Pa.

[21] Appl. No.: 46,416

[22] Filed: Jun. 7, 1979

Related U.S. Application Data

[63] Continuation of Ser. No. 914,459, Jun. 12, 1978, abandoned, which is a continuation-in-part of Ser. No. 752,032, Dec. 20, 1976, abandoned.

[51] Int. Cl.$^3$ .......................... C09C 3/12; C08K 9/06
[52] U.S. Cl. ........................ 106/308 Q; 106/288 B; 106/287.13; 106/287.14; 106/287.34; 106/195; 260/42.15; 556/467
[58] Field of Search ........... 106/308 Q, 288 B, 308 M

[56] References Cited

U.S. PATENT DOCUMENTS

| | | | |
|---|---|---|---|
| 2,801,185 | 7/1957 | Iler | 106/288 B |
| 2,917,406 | 12/1959 | McBride | 106/308 B |
| 3,085,905 | 4/1963 | Prevot et al. | |
| 3,132,961 | 5/1964 | Pierpont et al. | 106/308 |
| 3,377,311 | 4/1968 | Roch | 260/37 SB |
| 3,499,778 | 3/1970 | Cain et al. | 106/288 B |
| 3,556,830 | 1/1971 | Charrin et al. | 106/309 |
| 3,607,337 | 9/1971 | Offenbach et al. | 106/288 Q |
| 3,634,288 | 1/1972 | Youngs | 106/308 Q |
| 3,649,588 | 3/1972 | Kennedy-Skipton | 260/37 SB |
| 3,677,784 | 7/1972 | Nitzsche et al. | 106/309 |
| 3,700,473 | 10/1972 | Razzano et al. | 106/288 Q |
| 3,902,915 | 9/1975 | Crawford et al. | 106/288 B |
| 3,929,502 | 12/1975 | Hodgkin et al. | 106/308 Q |
| 3,929,718 | 12/1975 | Kratel et al. | 260/37 SB |
| 3,948,676 | 4/1976 | Laüfer | 106/309 |
| 3,959,174 | 5/1976 | Winyall et al. | 252/317 |
| 4,001,379 | 1/1977 | Türk et al. | 106/288 B X |
| 4,030,940 | 6/1977 | Chuiko et al. | 106/308 Q |
| 4,038,224 | 7/1977 | Eisenmenger et al. | 106/308 Q X |
| 4,095,994 | 6/1978 | Crawford et al. | 106/288 B |
| 4,141,751 | 2/1979 | Moreland | 106/308 Q |
| 4,155,769 | 5/1979 | Almagro | 106/288 B |

OTHER PUBLICATIONS

Dow–Corning Bulletin, 22–203 "Information About Powder Treatments" Jun. 1972.

*Primary Examiner*—Helen M. McCarthy
*Attorney, Agent, or Firm*—Irwin M. Stein; Robert J. Grassi

[57] ABSTRACT

Finely divided silica is used as a flattening agent to reduce gloss in lacquers and varnishes, but untreated silica tends to settle out of certain lacquers and varnishes to form a hard layer that is resistant to redispersion. Treatment of the silica with a reactive organopolysiloxane such as methyl hydrogen polysiloxane reduces the tendency of the silica to settle and renders it more easily redispersible. The treated silica may be incorporated into known lacquers, varnishes, and other coating compositions.

17 Claims, No Drawings

SOFT-SETTLING SILICA FLATTING AGENT

RELATED APPLICATIONS

This application is a continuation application of our application Ser. No. 914,459, filed June 12, 1978, now abandoned, which application is a continuation-in-part application of our application Ser. No. 752,032, filed Dec. 20, 1976 now abandoned.

BACKGROUND OF THE INVENTION

This invention relates to silica flatting agents for coating compositions, particularly to silica flatting agents that settle softly, if at all, and are easily redispersed; to methods for preparing such flatting agents; and to coating compositions containing them.

The problem of hard settling of silica flatting agents in coating compositions is well known, and methods of treating silica to correct the problem have been proposed. U.S. Pat. No. 2,625,492 discloses a non-hard settling silica flatting agent prepared by treating an ammoniated silicofluoride. U.S. Pat. No. 3,607,337 describes a soft-settling silica which is impregnated with an inert wax or a polymer such as polyethylene by stirring a wax or polymer emulsion into an aqueous suspension of precipitated silica, filtering, drying, and grinding to a fine powder.

The treatment of silica with reactive organopolysiloxanes is also known, but the treatment of a silica flatting agent with a reactive organopolysiloxane has not been shown. U.S. Pat. Nos. 3,929,718, 3,377,311, 3,085,905, 3,132,961, 3,556,830, 3,649,588, 3,700,473, and 3,948,676 relate generally to the treatment of finely divided silica with organopolysiloxanes for use as filler in silicone rubber. U.S. Pat. No. 3,634,288 relates to the preparation of hydrophobic, polysiloxane-treated silica sols for use as antifoam agents in, for example, latex paints.

U.S. Pat. No. 3,377,311 discloses the treatment of silica with an organopolysiloxane having an end group reactive with the silica, and discloses the use of the treated silica as filler in silicone rubber.

Dow Corning Corporation Bulletin 22-203, dated 6/72, discloses that Dow Corning® 1107 fluid, a methyl hydrogen polysiloxane, may be used to render silica hydrophobic and free flowing. However, no use for such treated silica is disclosed. All of the above prior art have taught or suggested the requirement of completely coating silica particles with coating such as polysiloxane to obtain redispersion or good adhesion with rubber.

SUMMARY OF THE INVENTION

It has now been found that silica flatting agents may be rendered softer settling and more easily redispersible in polar coating compositions by treating pellets of the silica with from 0.1 to 6.0 weight percent of silica of a liquid organopolysiloxane having sites reactive with the silica; milling the treated pellets at temperatures up to 270° C. for a time sufficient to produce a treated flatting agent having agglomerate sizes of from 1 to 40 microns, and which agglomerates are hydrophilic, and having distributed thereon between about 0.1 to 6 percent by weight of silica of the polysiloxane, and then recovering the treated flatting agent. For example, the polysiloxane is methyl hydrogen polysiloxane and the silica is an amorphous precipitated silica.

DETAILED DESCRIPTION OF THE INVENTION

Description Of Silica Flatting Agents Used In This Invention a. Use of Flatting Agents

Silica flatting agents are incorporated into coatings such as furniture lacquers, topcoat lacquers for vinyl fabrics, coil coatings, appliance finishes, metal furniture finishes, and texturized finishes for vinyl fabrics in order to lend a matte or semi-matte appearance to dried coating films. Such coatings may be transparent or pigmented. Silica flatting agents tend to settle out of certain coatings upon storage, and, particularly in the transparent coatings, i.e., the clear polar solvent coating compositions that effect settling, the settled silica may form a hard layer that is very difficult to redisperse by simple stirring or by inversion of the storage container.

b. Type Of Silica Flatting Agents And Size of The Silica Particles

Any type of silica which is known in the art for use as flatting agent in coating compositions, particularly in those polar solvents compositions that have settling, may be treated in accordance with this invention to obtain a soft-settling flatting agent for use in such compositions. Commercially produced silica flatting agents may be treated in accordance with this invention, but this invention is especially suitable for hydrophilic silicas such as precipitated silicas. Each of these silicas differs in agglomerate structure, agglomerate particle shape, and agglomerate particle size distribution and as a result provides different performance characteristics in coating applications.

In a discussion of silica, various types of particles may be mentioned. An ultimate particle of silica is one which cannot be reduced in size except by breaking chemical bonds. When ultimate particles adhere tightly to one another, they form an aggregate, which can be broken apart only by the application of considerable force. A loose grouping of several ultimate particles or small aggregates is an agglomerate, which has a considerable amount of air space in its structure. The agglomerate can be broken apart by the application of moderate force.

Precipitated silicas are particularly advantageous as flatting agents because of the nature of the agglomerate formed by the manufacturing process. The agglomerate is typically composed of ultimate silica particles having a particle size of about 0.02 microns, which are usually strongly associated together in small aggregates, which in turn are spaced apart in an open agglomerate structure comparable to a loose bunch of grapes.

Amorphous, synthetic precipitated silicas are produced commercially by the gradual acidification of aqueous alkali metal silicate, usually sodium silicate. Methods for the production of precipitated silica are well known. See, for example, U.S. Pat. Nos. 2,940,830 and 2,924,510. Typically, an aqueous solution of sodium silicate is slowly acidified with carbon dioxide, or an acid salt thereof such as sodium hydrogen carbonate or mineral acids.

After the precipitation step, the reaction medium containing the precipitated silica is washed and allowed to settle or thicken and the thickened slurry is filtered to produce a filter cake. The filter cake is then dried in, for example, a conventional rotary dryer. Dryer product is crushed, if necessary to break up large lumps, and then milled to the agglomerate sizes needed for the intended use. The dryer product may be screened to obtain a pellet fraction, for example, between −4 or −8 and +28 Tyler mesh (⅛ inch or ¼ inch to 1/64 inch), if desired for feeding to a particular mill. These pellets are then milled in conventional mills to produce a product having the greater weight of its agglomerates in the range of beween about 1 and 30 microns, with a substantial proportion in the 2 to 20 micron range. Such mills are known, and include mechanical mills such as roller mills and vertical hammer mills, and fluid energy mills. The mechanical mills may be used effectively to produce agglomerates having a median size of 7 to 10 microns, which are useful particularly in coil coatings, appliance finishes, and vinyl fabric topcoats. Agglomerates having a median size in the range of 2 to 7 microns, e.g., about 4 microns, may be produced conveniently in a fluid energy mill, or by size classification of mechanically milled material, e.g., with the use of an air classifier.

The silica flatting agents useful in the present invention are at least about 90 weight percent, e.g., 94 to 97 weight percent, $SiO_2$ on an anhydrous basis, but depending upon the method of preparation, minor proportion of contaminants, e.g., metal oxides, carbonates, halides, etc., may also be present. For example, an amorphous, hydrated, precipitated silica useful in the practice of this invention may be about 94 weight percent $SiO_2$, 1 to 2 percent NaCl or $Na_2SO_4$, 0.5 to 1 percent CaO, and 0.4 to 0.8 percent trace metals (expressed as oxides) such as aluminum, chromium, zirconium, barium, and iron. Further, the useful silicas may contain chemically combined and adsorbed water in varying amounts, depending partly upon the prevailing relative humidity. Thus, the water content may be 5, 10, even 20 percent or more by weight of hydrated silica.

1. Amorphous Hydrated Precipitated Silica Flatting Agents

Amorphous, hydrated precipitated silica flatting agents prepared in accordance with this invention have an ultimate particle size of between about 0.01 and 0.05 micron, typically about 0.02 microns, agglomerates distributed over broad range of sizes, e.g., from below 1 to about 40 microns with a substantial proportion in the 2 to 20 micron range, a weight median agglomerate size of between about 2 to 12 microns, and a B.E.T. surface area of 100 to 300, typically about 150, square meters per gram. The surface area is measured with the use of nitrogen gas by the method of Brunauer, Emmett, and Teller, *Journal of American Chemical Society*, 60, 309 (1938).

The agglomerate size distributions of hydrated, precipitated silica disclosed herein are determined in accordance with a Coulter Counter Test Method in which a Coulter Counter, Model B (Coulter Electronics, Inc., Chicago, IL) is used with a 100 micron aperture. A 40 milligram sample of the silica is dispersed in 100 milliliters of 1 percent saline solution, ISOTON® II (manufactured by Coulter Diagnostics, Inc.), for 10 minutes at 1000 rpm with a 4 blade 1.75 inch propeller stirrer in order to disperse the agglomerates without breaking them up. Five milliliters of the resulting dispersion is diluted with 245 milliliters of ISOTON® II and counted. The Coulter Counter with 100 micron aperture detects particles between about 2 and 40 microns, but does not detect particles smaller than 2 microns. Particles below 2 microns contribute little or no flatting effect, so that this test method detects only those particles which contribute to the flatting effectiveness of the tested materials.

2. Size Distribution Of Silica Flatting Agents

Flatting agents of different size distributions and median sizes are preferred for different applications. Thus, hydrated, precipitated silicas having an agglomerate size distribution over the range of from about 2 to about 30 microns and a weight median agglomerate size of between about 8 and 12 microns, e.g., 10 microns, are often used, for example, in texturized vinyl fabric topcoats or coil coatings. Those having an agglomerate size distribution over the range of from about 2 to about 20 microns and a weight median agglomerate size of between about 6 and 8 microns, e.g., about 7 microns, are particularly useful, for example, in coil coatings, appliance finishes, and metal furniture finishes. Those having an agglomerate size distribution over the range of from about 2 to about 10 microns and a median size of between about 2 and 6 microns, e.g., about 4 microns, are particularly useful, for example, in nitrocellulose funiture lacquers, and in vinyl topcoat lacquers where low gloss and a very smooth finish are desired.

When it is stated herein in the specification and the claims that a flatting agent, e.g., an amorphous, precipitated silica flatting agent, has an agglomerate size distribution of from 2 to 30 microns, from 2 to 20 microns, from 2 to 15 microns, or from 2 to 10 microns, it is meant that at least 75, e.g., 75 to 95, weight percent; at least 70, e.g., 70 to 95, weight percent; at least 60, e.g., 60 to 90, weight percent; or at least 45, e.g., 45 to 75, weight percent, respectively, of the silica is in the specified range. Generally, the broader is the size range, the higher is the weight percent of silica within the range. For silica of a specified size range, e.g., 2 to 10 microns, the greater weight of the silica that is not within the range will be below the range. That is, a flatting agent of a stated size range will be substantially free of particles above the size range, but may have a substantial weight proportion of particles below the size range.

Although precipitated silica flatting agents will typically have agglomerate particles having sizes over the broad ranges herein disclosed, silica flatting agents may have particles over only a part of a range, or of uniform size within a range. The desirable particle sizes and size ranges for flatting agents are well known, but are recited herein in order to characterize more fully the products made in accordance with this invention.

Although hard settling may be experienced with these flatting agents in a number of types of coating formulations, the problem is particularly acute in certain clear coating formulations such as nitrocellulose lacquers, vinyl topcoat lacquers, and varnishes. It is stated in U.S. Pat. No. 3,607,337, at Column 1, lines 14–16, that the presence in lacquers of small amounts of polar solvents, such as lower alcohols, increases the tendency of untreated silica to form hard deposits upon settling. However, no reliable way has been found to predict the settling behavior of a silica flatting agent in a particular formulation. It has been observed that untreated precipitated silica flatting agent will settle hard in the nitrocellulose lacquer formulation shown in Example I of this specification, but does not settle hard in the nitrocellulose lacquer formulation shown in Example III.

Thus an advantage of the treated flatting agents of this invention is that they may be used in a wide variety of lacquers and varnishes with less fear of hard settling. Manufacturers of such coatings frequently make changes in their formulations in response to changes in the price and availability of the ingredients. Such changes may as a consequence of this invention be made with greater confidence that the flatting agent will be soft-settling or non-settling in the new formulation.

TYPE OF ORGANOPOLYSILOXANES a. General Description Of Organopolysiloxanes

Organopolysiloxanes that may be used in the practice of this invention include all those linear, branched, and cyclic polysiloxanes known in the art which are reactive with silica and become chemically bound to silica particles by the reaction of the reactive site on the silicon atom which consists of a substituent having a reactive group which reacts with the acidic silanol sites on the silica. Preferred are reactive sites of alkoxy, hydroxyl, halogen, acyloxy, hydrogen, epoxides, and alkenyl. More preferred are reactive sites of hydrogen, hydroxyl, epoxides and alkenyl. Especially preferred are organopolysiloxanes which have reactive sites in which the substituent group on the silicon atom is hydrogen, for example methyl hydrogen polysiloxane. In general, the number of reactive sites per polysiloxane molecule, is about one reactive site per one silicon atom to thirty silicon atoms, so that the polysiloxane molecule acts as a chain which hold together the particles of silica like a charm bracelet. Thus, as used herein and in the claims, the phrase "liquid polysiloxane having sites reactive with the silica" refers to these types of polysiloxanes. Thus, the polysiloxanes contemplated herein are reactive by virtue of these silicon functional groups; such as $$-\overset{|}{\underset{|}{Si}}-H, \quad -\overset{|}{\underset{|}{Si}}-Cl, \quad or \quad -\overset{|}{\underset{|}{Si}}-OCH_3$$

which may react with the silica to form $$-\overset{|}{\underset{|}{Si}}-O-\overset{|}{\underset{|}{Si}}-$$

bonds to the silica surface, or they may be reactive by virtue of organofunctional groups such as

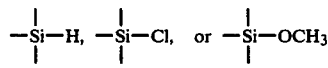

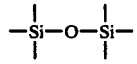

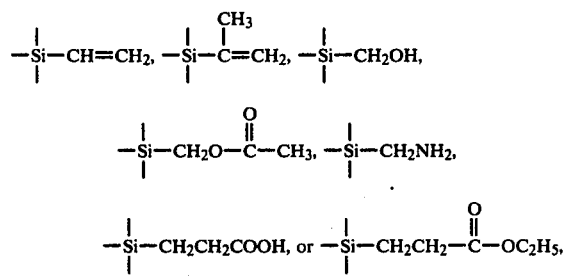

which may react with the silica without cleaving the original

bond. Thus, reactive organopolysiloxanes, as the term is used herein in the specification and the claims, are organopolysiloxanes which become chemically bound to silica particles either directly through a silicon atom that is part of the siloxane backbone or through an organofunctional substituent on such a silicon atom.

Structurally, organopolysiloxanes have a backbone of alternating silicons and oxygens in linear, branched, or cyclic arrangements such as

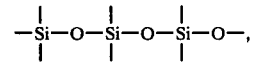

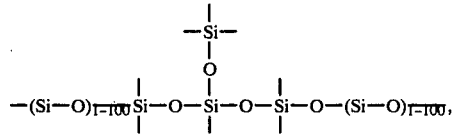

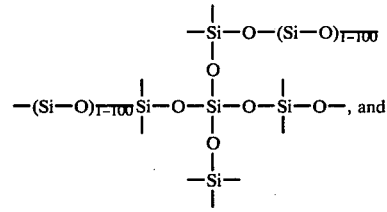

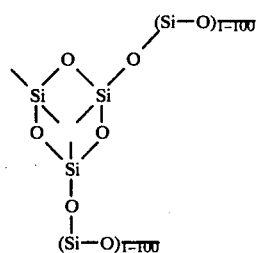

on which are distributed various substituents bound to silicon which may be reactive towards silica or inert. Typical substituents include aryl and halogenated aryl groups such as phenyl, chlorophenyl, and tolyl; arylalkyl groups such as phenylethyl and benzyl; aliphatic, haloaliphatic, and cycloaliphatic groups such as alkyl, alkenyl, cycloalkyl, and haloalkyl groups, including methyl, ethyl, vinyl, allyl, propyl, chlorobutyl, cyclohexyl, and trifluoropropyl, and cyanoalkyl groups such as cyanoethyl, cyanopropyl, cyanobutyl, etc. The substituents may be all the same on one molecule or different. Frequently, several types of substituents are present in varying proportions, for example, phenyl, methyl, and vinyl groups.

b. Examples Of The Organopolysiloxanes

Organopolysiloxanes useful in the practice of this invention are characterized by two qualities: reactivity with silica, and the ability to be distributed uniformly on finely divided silica. Thus, useful organopolysiloxanes have two or more sites per molecule that is reactive with silica. Reactive sites may be silicon-functional, so that in the reaction with silica, a substituent on a silicon atom of the polysiloxane leaves, allowing the silicon to bond directly to the silica by reaction with a silanol group on the silica to form an Si—O—Si link. Organopolysiloxanes having silicon-functional sites are those in which at least one silicon atom bears a substituent such as a hydrogen, a hydroxyl, a lower alkoxy such as methoxy or ethoxy, a lower acyloxy such as acetyl, or a halogen such as chlorine or bromine.

In addition, reactive sites may be organofunctional, so that in the reaction with silica, a substituent on a silicon atom itself reacts with the silica while remaining bound to the silicon, thereby forming an organic link between the polysiloxane and the silica. Organofunctional substituents reactive with silica include alkenyl groups such as vinyl and allyl; hydroxyorganic groups and their esters, such as hydroxymethyl, hydroxyethyl, 2-hydroxypropyl, and esters thereof with acids such as acetic and propionic acids; carboxyorganic groups and their esters, such as —CH$_2$CH$_2$COOH and —CH$_2$CH$_2$COOC$_2$H$_5$; aminoorganic groups such as aminomethyl and aminoethyl groups; and epoxyorganic groups such as

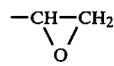

The number of reactive sites, silicon-functional and organofunctional, to non-reactive sites, e.g., saturated hydrocarbon and substituents, on the polysiloxane is preferably about 1 per 5 to 1 per 1 of Si—O units in the molecule, so that there is at least about 1 reactive substituent per every thirty Si—O subunit in the molecule.

c. Preferred Organopolysiloxanes

Organopolysiloxanes having a hydrogen, hydroxyl, vinyl, or epoxide group bound to a silicon atom are preferred because in the reaction with silica the only by-products are hydrogen gas or water, rather than the alcohols, carboxylic acids, and hydrogen halides released when the other reactive polysiloxanes react with silica. Particularly preferred are organopolysiloxanes having a plurality of reactive hydrogens, i.e., hydrogens bound to silicon atoms, distributed along the siloxane backbone, because such polysiloxanes react at ordinary temperatures, i.e., between about 15° and 90° C., at desirable rates, i.e., slowly enough to permit uniform distribution of the polysiloxane on the silica, yet quickly enough so that heat aging or prolonged reaction times are not required.

Most preferred are polysiloxanes in which substantially at least one per thirty to one per one, preferably at least one per five to one per one silicon atom in the chain bear a reactive hydrogen atom, and a non-reactive group such as methyl. In the specification and the claims, the term "methyl hydrogen polysiloxane" is intended to refer specifically to such polysiloxanes. Methyl hydrogen polysiloxanes may be prepared by the hydrolysis and condensation of methyl hydrogen dichlorosilane if desired, but they are available commercially.

Polysiloxanes may be prepared in a wide range of chain lengths or molecular weights, and hence a wide range of viscosities, from watery fluids to syrupy or honey-like fluids to soft gums. Any above described reactive organopolysiloxane that is a liquid at the temperature at which it is applied to the silica may be used in the practice of this invention. Furthermore, any reactive polysiloxane, even a gum or very viscous fluid, may be used in the practice of this invention if it is dissolved or dispersed in a solvent such as methylene chloride in order to lower the viscosity and promote more uniform distribution of the polysiloxane on the silica being treated. However, very viscous liquid polysiloxanes or solutions of polysiloxanes may be difficult to disperse uniformly. Therefore, liquid polysiloxanes or liquid solutions of polysiloxanes of low to moderate viscosity, up to about 1000 centipoises at the temperature of application, are therefore preferred for their greater ease of application.

Two commercially available methyl hydrogen polysiloxane fluids that have been found useful are Dow Corning ® 1107, which has a viscosity at 25° C. of about 30 centistokes, and Union Carbide ® L-31, which has a viscosity at 25° C. of about 42 centistokes.

PROCESS FOR PREPARING THE SILICA FLATTING AGENT

The silica flatting agent described herein is prepared in general by treating pellets of the silica described herein, with from 0.1 to 6 weight percent based on silica of liquid organopolysiloxane described herein having sites reactive with the silica, and milling the treated pellets at temperatures up to 270° C. for a time sufficient to produce a treated flatting agent having agglomerate sizes as described herein of from 1 to 40 microns and which agglomerates are hydrophilic, have distributed thereon between from about 0.1 to 6 weight percent of silica of said polysiloxane, and then recovering the treated flatting agent.

a. Treating The Pellets Of The Silica

The phrase "treating pellets of the silica" refers to any method of applying the organopolysiloxane directly to the silica, particularly to those described herein.

The reactive liquid organopolysiloxanes may be applied to the silica directly, or they may first be diluted to a suitable solvent such as ethanol, isopropanol, acetone, methyl ethyl ketone, methylene chloride, fluorinated hydrocarbons such as aerosol propellants, benzene, toluene, and VM&P naphtha (a varnish and paint making grade). The proportion of solvent to polysiloxane may be varied widely depending upon the initial viscosity of the polysiloxane and the method used to apply the solution. Thus, a small proportion of solvent, e.g., between about 1 and 10 weight percent, may be sufficient, but large proportions, e.g., up to about 80 percent or even 95 percent or more may be used. Even when the viscosity of the fluid being used is low, if a small proportion is to be applied, e.g., about 2 percent by weight of silica, the application of the fluid as a solution may provide more uniform distribution.

In order to avoid the use of dangerous, expensive, and potentially toxic solvents, it is desirable to apply the polysiloxane in the form of an aqueous emulsion. The emulsion is easily dispersed, and the water may be removed if necessary by gentle heating without need for recycling or for the control of toxic or flammable vapors. Because aqueous emulsions may cause some agglomeration of the silica if not well distributed during application, it may be preferable for this reason to apply the emulsion to the silica, e.g., precipitated silica in dryer pellet form, before it is milled down to the desired agglomerate size range for flatting agents. Aqueous emulsions of methyl hydrogen polysiloxane are commercially available. Aqueous emulsions of other polysiloxanes may be prepared by high-speed agitation with the use of conventional emulsifiers.

As used herein in the specification and the claims, the phrase "liquid polysiloxane" is intended to include liquid polysiloxanes and liquid solutions or emulsions of polysiloxanes. If desired, catalysts such as triethylamine, morpholine, pyridine, silazanes, silylamines, ammonium carbonate, dibutyl tin dilaurate, stannous octoate, zinc octoate, and iron octoate may be distributed on the silica in order to promote reaction between the silica and the polysiloxane. The reaction of methyl hydrogen polysiloxanes with silica is also catalyzed by steam.

The reactive polysiloxane is applied to the silica in proportions sufficient to lessen the tendency of the silica to settle hard and to render the silica more easily redispersible in lacquers and varnishes, for example, between about 0.1 and 6 percent by weight of silica. Thus, as little as 0.1 percent by weight of silica may provide a beneficial effect, but is preferable to use between about 1 and 4 weight percent. The preferred amount to use depends upon the particular formulation in which the silica will be used. The use of 2 weight percent methyl hydrogen polysiloxane, for example, has been found consistently to eliminate hard settling of silica flatting agent in Lilly Lacquer 1402 when tested over settling periods of up to two months.

An excessive proportion of reactive polysiloxane may be less effective than a smaller proportion. Furthermore, the proportion of polysiloxane used is not so great (less than 8 percent) as to interfere excessively with the recoatability of a coating formulation containing the treated silica. That is, an article coated with compositions described herein can easily be recoated with one or more of these compositions. A desirable proportion of polysiloxane reduces but does not eliminate the hydrophilic character of the silica.

The polysiloxane may be applied to the silica at many stages during the preparation of the silica. Thus, the silica may be precipitated in the presence of polysiloxane emulsion or emulsion may be added to the slurry of precipitated silica, in a process similar to that disclosed in U.S. Pat. No. 3,607,337. Polysiloxane or a solution thereof in an organic solvent may be applied uniformly to the silica by treating the silica as described above and then milling the treated silica to the desired agglomerate size for use as a flatting agent, for example in a tumbling-type mixer or any other conventional means for distributing relatively small amounts of fluid onto powders. However, uniform application to the finely milled silica is difficult because of the low bulk density of the silica and the amount of dust generated.

A highly preferred method involves treating pellets of silica by applying the polysiloxane or solution or aqueous emulsion thereof to pellets of amorphous, precipitated silica such as those obtained from the dryer discharged as described above, then milling the silica pellets at the temperature described herein, to the desired agglomerate size before the polysiloxane is fully reacted with the silica, and then allowing the polysiloxane to fully react with the silica. The median agglomerate size of the milled silica is substantially smaller than that of the pellets. If the polysiloxane reacts quickly with the silica, milling must be done soon after the polysiloxane is applied to the pellets. Otherwise, the polysiloxane will react fully at the surfaces of the pellets and will not become uniformly distributed upon milling. As the temperature of polysiloxane coated silica increases, the shorter is time between mixing and milling, but at lower temperatures the time between mixing and milling may be extended to achieve more uniform distribution. Furthermore, at the lower temperatures of treating the silica pellets, the longer may be the delay time before milling the treated pellets to achieve uniform distribution. At the higher temperatures, the shorter the delay time.

A specific, preferred embodiment of this method of application comprises distributing methyl hydrogen polysiloxane on pellets of silica, milling the polysiloxane-treated silica, before reaction between the polysiloxane and the silica is substantially complete, down to the desired median agglomerate size, and allowing the polysiloxane and the milled silica to react further. The time between distributing the polysiloxane and milling the pellets, which is desirable as short as possible, depends in part upon temperature. When the methyl hydrogen polysiloxane is applied and the treated silica is stored at room temperature, i.e., between about 15° C. and 25° C., the silica must be milled within about 0 to 48 hours. Thus this embodiment may be practiced effectively as a continuous process with little or no delay between application and milling, or as a batch process with a delay of up to about 48 hours between application and milling. After milling, the treated silica is allowed to age for a time that also depends upon temperature, but will typically be at least about 2 hours. When the silica is milled and aged at room temperature, the aging period is at least about 12 hours, preferably at least about 24 hours. In practice, the aging period will ordinarily pass while the milled silica is bagged and shipped to the lacquer or varnish maker.

Silica pellets useful in this method of application are agglomerates of finely divided silica, preferably amorphous, precipitated silica, which may be reduced by mechanical or fluid energy milling to particle or agglomerate sizes useful in flatting agents. The pellets have substantially higher bulk density than the milled product, and thus smaller equipment may be used to apply and distribute the polysiloxane. It is easier to mix the polysiloxane with such pellets than to mix it with the light, milled powders.

The pellets may vary widely in size, for example from about 4 to about 28 mesh, although larger and smaller pellets may also be used, the choice being based on the feed requirements of the particular mill being used, on the bulk density of the pellets, and on convenience in handling. The distinction between these "pellets" and the agglomerate particles of the milled flatting agent is one of size. Thus, pellets smaller than about 28 mesh may be treated in accordance with this invention, but as the pellet size decreases, the advantage of using pellets also decreases. The poured bulk density of the pellets, e.g., about 15 pounds per cubic foot, is higher than that of the milled flatting agent, usually at least about 1.25 times, typically between about 1.5 to 10 times. that of the milled product. Thus, the milled product may have a bulk density of from about 2 to about 10 pounds per cubic foot.

In general, the reactive polysiloxane may be placed on the silica in any way known in the art for the treatment of silica with polysiloxanes, at temperatures up to 270° C. and at pressures consistent with maintaining the polysiloxane in the liquid state or the solution or emulsion thereof in the liquid state, as the method of application requires. The temperature must be high enough to provide a useful rate of reaction but low enough to avoid decomposition of the polysiloxane and to avoid driving the polysiloxane from the silica before reaction can take place. Temperatures between about 0° and 100° C., more typically between about 15° and 50° C. are often useful.

b. Most Preferred Method of Preparing Silicas

In a further embodiment, which is the best mode of preparing the silica now contemplated by the inventors, pellets of hydrated, precipitated silica and reactive polysiloxane, notably methyl hydrogen polysiloxane, are fed independently into a mill such as a mechanical mill, or preferably, a fluid energy mill, and are milled together therein at the temperatures described herein. The pellets and the polysiloxane may be fed separately directly into the mill, e.g., into the venturi of a fluid energy mill, or they may be fed separately into a device such as a screw or conveyor that directly feeds the mill. Both forms of feeding are within the intended meaning of the phrase "fed independently into the mill". Of course, alternating intermittent feed so coordinated as to have the effect of continuous simultaneous feed, so that the silica and the polysiloxane are milled together in the mill, is also within the intended meaning. The point of this embodiment is that a separate blending step is avoided. Rather, the milling and blending are both accomplished in the mill. Furthermore, there is no need to age treated pellets before milling. The polysiloxane may be fed pure or in solution or emulsion form as desired. In general the temperature of milling may be up to 270° C. but it is preferred that lower temperatures be used so as to maintain the hydrophility of the treated silica particles.

Fluid energy mills and methods of operation useful in the practice of this invention are described in McCabe and Smith, *Unit Operation of Chemical Engineering*, 2nd. Ed., (McGraw-Hill Book Co.: New York, 1967), pages 838–839, and Perry and Chilton, *Chemical Engineers' Handbook*, 5th Ed., (McGraw-Hill Book Co.: New York, 1973), pages 8-43 and 8-44. Such mills are typically fed by a conveyor or screw that delivers pellets to a venturi injector at the mill. The organopolysiloxane may be applied at any convenient point in the feed line up to and including the venturi injector. Preferably, the organopolysiloxane is applied to the pellets and distributed thereon before the pellets enter the injector. However, because fluid energy mills provide thorough mixing of the milled powder and consequently provide uniform distribution of the polysiloxane on the powder, uniform distribution of the polysiloxane on the feed pellets is not critical. One advantage of the use of a fluid energy mill is that most solvent or water added with the polysiloxane is removed in the mill, saving an additional processing step.

Fluid energy mills are powered typically with compressed air or superheated steam. The steam may enter the mill at temperatures of 500° F. or higher, so that the treated particle is subject to temperatures of up to 270° C. for a brief period of time, but cools rapidly, so that the powdered product may come out at about 100° to 200° F. Therefore, the organopolysiloxane must have low enough volatility and high enough stability to remain on the silica during the brief period when it is exposed to the high temperature steam. In general, organopolysiloxanes of at least moderate molecular weight, e.g., about 2000–3000, will be useful. Because operating conditions may vary widely, a useful molecular weight for the desired polysiloxane is best determined by test.

The polysiloxane treated silica flatting agents of this invention may be used in any of the known coating formulations in which silica flatting agents are used, principally lacquers and varnishes such as nitrocellulose lacquers and vinyl lacquers. The treated silicas have a flatting efficiency very nearly as great as the corresponding untreated silicas, and in addition, are easily redispersed after settling, if they settle at all. The use of the treated silica flatting agents in formulations in which untreated silica settles hard thus provides improved formulations.

In order to determine whether a flatting agent settles "hard", in a particular coating formulation, as the term is used in the application and the claims, the following procedure, hereinafter called "the test tube inversion test", may be used. The flatting agent is dispersed in the coating formulation at a concentration of 5.2 percent by weight of dry solids in the formulation by stirring as described in greater detail hereinafter in Example I, third paragraph. A 10 milliliter portion of the resulting formulation is placed in a stoppered, 15 by 150 millimeter test tube, which is allowed to rest vertically for 24 hours. The extent of settling is observed by tipping the bottom of the tube from 45 degrees below the horizontal to 45 degrees above, thereby partially inverting the tube, and the presence or absence of a deposit of settled flatting agent on the bottom is noted. The tube is then inverted repeatedly and the number of inversions required to redisperse the deposit is recorded. A flatting agent settles "hard" if 50 or more inversions are required to redisperse the deposit. It settles "soft" if fewer than 10 inversions redisperse the deposit. It is "non-settling" if no deposit is present after one or two inversions. By "non-settling" it is meant that the bulk of the flatting agent is uniformly resuspended or redispersed by very gentle agitation so that no more than a slight film of very fine particle silica, if any, remains at the bottom. Even a flatting agent that is "non-settling" by this standard may settle very softly to form a loose floc topped by a band of clear liquid, but the floc is so loose that one or two inversions redisperse it. It has been found that this test correlates well with the usual industry test for settling, which is two-month storage of coating formulation in cans.

The coating formulations in which the flatting agents of the present invention can be used contain at least one film former and at least one solvent. Plasticizers and resins are usually included, especially in lacquers, in order to increase film toughness and resistance to scratching, cracking, checkering, etc., and pigments in addition to flatting agent may also be present.

The distinction between lacquers and varnishes is not clear cut, but lacquers generally dry by solvent evaporation whereas varnishes generally dry by oxidation. However, some lacquers contain oxidation-drying additives such as drying oil alkyd plasticizers, and varnishes dry at least partially by solvent evaporation.

Several film formers, plasticizers, solvents, and diluents may be present in varying proportions.

Film formers include cellulose derivatives such as cellulose acetate, ethyl cellulose, cellulose acetate butyrate, cellulose acetate propionate, and most notably, nitrocellulose; vinyl resins such as polyvinyl chloride, polyvinyl acetate, polyvinyl formal, polyvinyl alcohol, polyvinyl butyral, which may be copolymerized with vinylidene chloride and may also contain small portions of esters of maleic, fumaric, acrylic, and methacrylic acids, esters of acrylic acid and methacrylic acid, acrylonitrile, alkyl vinyl ethers, ethylene, and propylene; alkyl resins, i.e., polyesters of polyhydroxyl alcohols such as glycol, glycerol, and pentaerythritol, and polycarboxylic acids such as phthalic anhydride, maleic acid, and succinic, adipic, azelaic, and sebacic acids, chemically combined in different proportions with the acids of various drying, semidrying, and non-drying oils, such as linseed, soya, tung, castor, coconut, cottonseed, safflower, and fish oils; urea formaldehyde resins such as butylated urea-formaldehyde resins; and melamine formaldehyde resins. The cellulose derivatives, esters of acrylic and methacrylic acids and vinyl resins are found principally in lacquers. The alkyds, often in conjunction with the urea- and melamine-formaldehyde resins, are used primarily in varnishes.

Solvents include hydrocarbons such as benzene, toluene, xylene, cyclohexane, hexane, heptane, octane, and VMP (varnish makers and painters) naphtha, an aromatic or aliphatic naphtha boiling in the range of 240° to 550° F.; oxygenated solvents, which are used primarily in lacquers, particularly nitrocellulose lacquers, including alcohols such as methanol, ethanol, isopropanol, n-butanol, sec-butanol, isobutanol, and cyclohexanol, esters such as ethyl acetate, amyl acetate, and the butyl acetates, ketones such as acetone, methyl ethyl ketone, methyl isobutyl ketone, and cyclohexanone, glycol ethers such as ethylene glycol monomethyl ether and diethylene glycol monoethyl ether, ethers such as ethyl ether and isopropyl ether, other ethers and ether esters, and nitroparaffins such as nitromethane, nitroethane, and nitropropane.

This invention is concerned with an improved silica flatting agent useful in known lacquer and varnish formulations, including the lacquers and varnishes described in the voluminous technical literature of the coating industry, particularly D. Parker, *Principles of Surface Coating Technology*, (John Wiley & Sons: New York, 1965); The *Federation Series on Coating Technology*, Units 1 through 23, (F.S.C.T., 1315 Walnut Street, Philadelphia, PA 19107), and U.S. Pat. No. 3,607,337, which discloses specific urea-formaldehyde, nitrocellulose, polyamide resin, polyester resin, and alkyd resin lacquers and an alkyd enamel. Further specific nitrocellulose lacquer and varnish formulations appear in the following examples, which are intended to illustrate how the present invention may be practiced but not to limit the invention to the precise embodiments described. One typical nitrocellulose lacquer formula is:

| TYPICAL NITROCELLULOSE LACQUER | |
|---|---|
| Materials | Gallons |
| Cotton Cut[1] | 21.00 |
| Short Oil Coconut Alkyd | 6.00 |
| Epoxidized Soybean Oil | 2.25 |
| Dioctyl Phthalate | 0.75 |
| Isopropyl Acetate | 24.00 |
| Isobutanol | 12.00 |
| VMP Naphtha | 15.00 |
| Butyl Acetate | 4.00 |
| Xylol | 6.50 |
| Toluol | 4.50 |

[1]Cotton Cut:
½-sec RS nitrocellulose  17.00 volume percent
xylol  39.00
isopropanol  22.50

| TYPICAL NITROCELLULOSE LACQUER | |
|---|---|
| Materials | Gallons |
| esters | 21.50 |

EXAMPLE I

Precipitated silica having an ultimate particle size of about 0.021 microns was prepared by the gradual acidification of an aqueous solution of sodium silicate with carbon dioxide. The silica slurry was washed, allowed to settle, the supernatant decanted, and the cycle repeated several times. Finally, slurry having a pH of 6.2 was filtered and the filter cake was dried in a rotary dryer. The silica used in all the following examples was also prepared in this way. The resulting crumbs were crushed to −8 Tyler mesh and calcined for 30 minutes at 400° C. (Sample A). Note this temperature and time did not change the surface properties of the silica, i.e., allowed it to rehydrate and remain hydrophilic. A second portion of slurry was prepared as above except that the pH was reduced from 6.2 to 5.0 by addition of HCl before filtering (Sample B).

Two hundred grams (200 grams) of Sample A was placed in a Patterson-Kelley liquid/solid blender Model L-6677 and 1 percent by weight of silica of Dow Corning ® 1107 fluid, a methyl hydrogen polysiloxane, was added as 20 milliliters of solution in methylene chloride. Similarly, portions of Sample A containing 2 percent polysiloxane and Sample B containing 1 percent and 2 percent polysiloxane were prepared. The treated samples were tumbled for 20 minutes and dried overnight in a forced draft oven at 50° C. Each sample of treated silica was then milled at room temperature in a laboratory scale, 4 inch compressed air powered fluid energy mill at a feed rate of 30 grams per minute with a feed pressure of 55 pounds per square inch gauge and a grind pressure of 35 pounds per square inch gauge.

The treated silicas, 4 samples in all, were then incorporated at 5.2 percent by weight of resin solids into Lilly nitrocellulose lacquer 1402.

In this and the following examples, whenever flatting agent was incorporated into Lilly nitrocellulose lacquer, the following procedure was used. First, a grind vehicle was prepared by mixing 1060 grams of Lilly lacquer 1402 and 940 grams of the following solvent mixture:

5900 grams Isopropyl Acetate
  2750 grams Isobutanol
  3150 grams VMP Naphtha
  1000 grams n-Butyl Acetate
  1600 grams Xylol
  750 grams Toluol Sixty grams of grind vehicle was stirred in a ¼ pint paint can with a 1½ inch high shear blade at a speed sufficient to produce a small vortex, and flatting agent was added until the dispersion became pasty and did not move at the edge. The weight of flatting agent added was noted. The paste was then dispersed on a small sand mill without sand, using a 1½ inch high shear, high dispersion blade at 5000 revolutions per minute for 5 minutes, with occasional tapping of the can-edge. This high dispersion technique is intended to accentuate settling tendencies, but may result in overdispersion and lower flatting efficiency than the more gentle dispersion appropriate for precipitated silica flatting agents. Sufficient paste, which contains about 10 weight percent resin solids and 25 weight percent flatting agent solids, was stirred into more Lilly lacquer 1402 and sufficient solvent mixture to produce a final lacquer containing 19 percent by weight resin solids and 5.2 percent flatting agent based on resin solids.

In all tests using Lilly lacquer 1402, current production samples obtained from Lilly Industrial Coatings, Inc., 666 South California Street, Indianapolis, IN 46225, were used. Lacquers of this type are widely used in furniture finishings.

Four 4-ounce cans of lacquer containing the treated flatting agents were allowed to stand upside down for 3 weeks, and, after the cans were gently inverted, the settled flatting agent deposits were probed with a spatula. Results appear in Table I.

TABLE I

| Sample | Type of Settling |
|---|---|
| A + 1% polysiloxane[1] | Hard |
| A + 2% polysiloxane | None |
| B + 1% polysiloxane | Mod. Soft |
| B + 2% polysiloxane | Mod. Soft |

[1]Dow Corning® 1107 fluid, a methyl hydrogen polysiloxane

EXAMPLE II

In this Example silica pellets are coated with methyl hydrogen polysiloxane applied as a solution in ethanol or an emulsion in water. The effects on settling of aging the pellets before milling and of aging the milled flatting agent before incorporation into Lilly nitrocellulose lacquer are observed.

A 1200 gram portion of −8 and +28 Tyler mesh pellets of hydrated, precipitated silica having an ultimate particle size of about 0.021 microns was treated at room temperature with 2 percent by weight of silica of Dow Corning® 1107 fluid applied as a 20 percent solution in ethanol, and then divided into four samples. Portions of the samples were allowed to age for different times before and after milling in the 4-inch fluid energy mill and the resulting flatting agents were incorporated into pastes with Lilly lacquer 1402 as described above. Portions of the pastes were then diluted with more lacquer to obtain a final test lacquer having 5.2 percent silica by weight of resin solids. Similarly, silica pellets were treated with 2 percent methyl hydrogen polysiloxane applied as a 20 percent aqueous emulsion, i.e., Dow Corning's Syl-Off® 1107 diluted 1:1 with water. The polysiloxane solution or emulsion was added over a period of 15–28 minutes followed by 10 minutes of mixing.

Table II reports the aging periods before milling and between milling the silica and putting it into a paste. Settling behavior is reported as the number of inversions needed to resuspend settled silica by the hereinabove described test tube inversion test; counting stopped at 50 inversions.

TABLE II

| Sample Silica + 2% Methyl Hydrogen Polysiloxane Applied As: | Aged Before Milling | Between Milling and Putting Into Lacquer Paste | Inversions Needed After 1 Day | 2 Days |
|---|---|---|---|---|
| 20% Solution in Ethanol | | | | |
| 1 | minimum delay | minimum delay | >50 | >50 |
| 2 | minimum delay | 24 hours | 1 | 1 |
| 3 | 4 hours | minimum delay | 48 | >50 |
| 4 | 24 hours | minimum delay | 1 | 1 |
| 5 | 48 hours | minimum delay | 4 | 2 |
| 6 | 24 hours | minimum delay | 48 | >50 |
| 7 | 24 hours | 24 hours | 1 | 1 |
| 8 | 24 hours | minimum delay | 4 | 5 |
| 9 | 48 hours | minimum delay | 12 | 21 |
| 10 | 24 hours | 72 hours | 1 | 1 |
| 11 | 24 hours | 48 hours | 1 | 1 |
| 12 | 48 hours | 24 hours | 14 | 33 |
| 20% Emulsion in Water | | | | |
| 13 | minimum delay | minimum delay | >50 | >50 |
| 14 | minimum delay | 24 hours | 1 | 1 |
| 15 | 4 hours | minimum delay | 40 | >50 |
| 16 | 24 hours | minimum delay | 2 | 2 |
| 17 | 48 hours | minimum delay | 10 | 5 |
| 18 | 4 hours | minimum delay | 35 | >50 |
| 19 | 4 hours | 24 hours | 1 | 1 |
| 20 | 24 hours | minimum delay | 5 | 4 |
| 21 | 48 hours | minimum delay | 9 | 8 |
| 22 | 4 hours | 72 hours | 1 | 1 |
| 23 | 24 hours | 48 hours | 1 | 1 |
| 24 | 48 hours | 24 hours | 1 | 2 |
| Untreated Control | — | — | >50 | >50 |
| Untreated Control | — | — | >50 | >50 |

These data show that some aging is required after methyl hydrogen polysiloxane is applied to silica pellets. Although aging before milling may have beneficial effect if the period is not excessive, it is preferable to mill within 48, or better 24, hours and to age for about 24 hours after milling.

EXAMPLE III

Each of 10 25-pound portions of hydrated, precipitated silica pellets, sold by PPG Industries, Inc., under the designation Hi-Sil® 210, was coated with 2 weight percent methyl hydrogen polysiloxane applied as a 20 percent emulsion in water (Union Carbide's RE-28® 40 percent emulsion diluted 1 to 1). The emulsion was sprayed on the pellets over a 10 minute period while they were tumbled in a horizontal, rotating 55-gallon drum, and the treated pellets were allowed to age about 26 hours at room temperature before milling. All 250 pounds of treated silica was then milled in a superheated steam powered fluid energy mill (Fluid Energy's 0405-C mill) to an average agglomerate size of about 4 microns. Fifty pounds of untreated silica was also milled as a control.

After 3 days, samples of Lilly nitrocellulose lacquer 1402 containing the milled silica at a 5.2 percent loading were prepared as described in Example I and tested for settling both by the test tube inversion test and by 2 week settling in inverted ½ pint paint cans. After standing 24 hours in test tubes, the control contained a deposit of settled silica that failed to redisperse after 50 inversions, whereas the polysiloxane treated silica redispersed after only 1 or 2 inversions. After standing 2 weeks in inverted cans, the control contained a deposit of silica on the can lids that remained moderately hard to hard after 10 gentle inversions of the can, whereas no deposit of the polysiloxane treated silica remained after 10 inversions.

Three days after milling, samples of the control and treated milled silicas were also incorporated at 5.2 percent by weight of resin solids into the following nitrocellulose lacquer for a test of flatting efficiency. Neither the control silica nor the treated silica settles hard in this lacquer.

| FLATTING EFFICIENCY NITROCELLULOSE TEST LACQUER | |
|---|---|
| Material | Gallons per 100 Gallons |
| Toluene | 18.67 |
| ½ sec. RS Nitrocellulose[1] | 8.09 |
| Stir 10 minutes and add | |
| Ethanol, 95% | 3.67 |
| Methyl Isobutyl Ketone | 10.48 |
| Butyl Acetate | 11.68 |
| Mix until uniform solution and add | |
| Duraplex ND-77B[2] | 14.37 |
| Dioctyl Phthalate | 1.83 |
| Lacquer Thinner[3] | 31.16 |
| [1]Hercules Inc. | |
| [2]Rohm & Haas coconut alkyd | |
| [3]Lacquer Thinner | |
|    Ethanol, 95% | 15.00 parts by volume |
|    Methyl Isobutyl Ketone | 20.00 |
|    Butyl Acetate | 25.00 |
|    Toluene | 40.00 |

The control and treated silicas were dispersed into lacquer samples by direct stir-in at two agitation speeds using 1½ inch high shear blades. Samples dispersed at each speed were then evaluated by the Hegman test (a rough measure of the degree of dispersion, with high numbers indicating greater dispersion); the 60° gloss as measured with a Hunter D16 Glossmeter (Hunter Assoc. Lab., Fairfax, VA 22030); the 85° sheen as measured with the Gardner Glossmeter (Gardner Lab., Bethesda, MD); and the feed, a subjective estimate of the number of oversize agglomerates present in a dried lacquer film. The results are summarized in Table III.

TABLE III

| | 1000 rpm | | | | 2000 rpm | | | |
|---|---|---|---|---|---|---|---|---|
| | Hegman | 60° | 85° | Feel[1] | Hegman | 60° | 85° | Feel[1] |
| Control | 5½ | 13 | 40 | TM | 5½ | 14 | 46 | A |
| Treated | 6 | 17 | 53 | TM | 6 | 19 | 56 | AF |
| Treated | 6 | 17 | 53 | AF | 6 | 18 | 57 | Slightly Smoother |
| Treated | 6 | 18 | 54 | TM | 6 | 18 | 55 | TM |

TABLE III-continued

| | 1000 rpm | | | | 2000 rpm | | | |
|---|---|---|---|---|---|---|---|---|
| | Hegman | 60° | 85° | Feel[1] | Hegman | 60° | 85° | Feel[1] |
| Treated | 5½ | 14 | 45 | TM | 5½ | 15 | 47 | AF |

[1]TM = Too Many large agglomerates
AF = A Few large agglomerates
A = An Acceptable number of large agglomerates Similarly, 250 pounds of Hi-Sil ® 210 was treated with 2 percent methyl hydrogen polysiloxane applied as a 20 percent solution in ethanol. The Performance of the treated silica in the Flatting Efficiency Test Lacquer is shown in Table IV.

TABLE IV

| | 1000 rpm | | | 2000 rpm | | | |
|---|---|---|---|---|---|---|---|
| | Hegman | 60° | 85° | Hegman | 60° | 85° | Feel[1] |
| Control | 6 | 14 | 42 | 6 | 14 | 44 | TM |
| Treated | 6 | 16 | 54 | 6 | 17 | 61 | A |
| Treated | 6 | 15 | 50 | 6 | 15 | 51 | A |
| Treated | 6 | 16 | 52 | 6 | 17 | 57 | A |
| Treated | 6 | 14 | 47 | 6 | 15 | 49 | A |
| Treated | 6 | 14 | 46 | 6 | 15 | 53 | A |
| Treated | 6 | 14 | 46 | 6½ | 15 | 51 | A |
| Treated | 6 | 16 | 54 | 6 | 17 | 59 | A |

[1]TM = Too Many large agglomerates
A = An Acceptable number of large agglomerates Tables III and IV show that the polysiloxane treated silicas are effective flatting agents. The use of gentler milling techniques would increase the efficiency of the treated flatting agent at least to that of the control.

EXAMPLE IV

A total of 450 pounds of amorphous, precipitated Hi-Sil ® 210 silica pellets about 4 to 28 mesh in size at the rate of 300 pounds per hour and 45 pounds of a 20 percent aqueous emulsion of methyl hydrogen polysiloxane at the rate of 30 pounds per hour were fed together into the throat of a fluid energy mill to produce a flatting agent having agglomerates in the range of 2 to 10 microns with a median size of about 4 microns and 2 weight percent siloxane content.

Milled product was bagged and allowed to stand overnight. The day after milling, samples of the treated silica and of control silica made from the same feed pellets were incorporated into Lilly lacquer 1402 for a test tube inversion settling test. The results appear in Table V.

TABLE V

| | Inversions After | |
|---|---|---|
| Sample | 1 Day | 2 Days |
| 1 | 1 | 1 |
| 2 | 1 | 2 |
| 3 | 1 | 2 |
| 4 | 1 | 2 |
| 5 | 1 | 2 |
| 6 | 1 | 1 |
| control | >50 | >50 |
| control | >50 | >50 |

Introduction of the reactive polysiloxane at the mill produces a non-settling flatting agent. Other types of mill can also be used. Thus, where a silica flatting agent is produced by mechanical or fluid energy milling of silica, a siloxane-treated flatting agent of this invention may be obtained without additional steps and with only slight modification of the usual procedure for producing the untreated flatting agent.

EXAMPLE V

Samples of hydrated, precipitated silica flatting agent treated with 2 percent by weight of methyl hydrogen polysiloxane, of octamethylcyclotetrasiloxane, and of dimethyl polysiloxane, a polysiloxane that is not reactive with silica, were tested for settling in Lilly nitrocellulose lacquer by the test tube inversion test. After 1 day of settling, the methyl hydrogen polysiloxane treated silica was redispersed after only one inversion, but the dimethyl polysiloxane and octamethylcyclotetrasiloxane treated silicas were not redispersed after 50 inversions.

Although this invention has been described in terms of particular details and embodiments, the particulars are not intended to limit the invention, the scope of which is defined in the following claims.

We claim:

1. A process for preparing a soft-settling, hydrophilic, silica flatting agent, which comprises:
   a. treating pellets of amorphous, hydrated precipitated silica with between about 1 and 4 weight percent, based on silica, of liquid organopolysiloxane having sites reactive with the silica, said reactive sites being a substituent selected from the group consisting of alkoxy, hydroxyl, halogen, acyloxy, hydrogen, epoxides and alkenyl bound to a silicon atom,
   b. milling the treated pellets before the organopolysiloxane is fully reacted therewith at temperatures from 15° C. up to 270° C. for a time sufficient to produce a silica flatting agent having agglomerate sizes of from 1 to 40 microns,
   c. recovering silica flatting agent of step (b), and
   d. aging the silica flatting agent for at least two hours, the agglomerates of said flatting agent having a reduced hydrophilic character over that of the silica pellets and having distributed uniformly thereon the organopolysiloxane-silica reaction product.

2. The process of claim 1, wherein the pellets are milled in a fluid energy mill.

3. The process of claim 1 wherein the substituent of the reactive sites is selected from the group consisting of hydrogen, alkoxy, and halogen.

4. The process of claim 1, wherein the reactive sites are hydrogen substituents on silicon atoms.

5. The process of claim 4, wherein the organopolysiloxane is a methyl hydrogen polysiloxane.

6. A process for preparing a soft settling, hydrophilic, silica flatting agent, which comprises:
   a. independently feeding to a mill and milling together from 15° C. up to 270° C. pellets of amorphous, hydrated precipitated silica and between about 1 and 4 weight percent, based on silica, of liquid organopolysiloxane having sites reactive with the silica for a time sufficient to produce a silica flatting agent having agglomerate sizes of from 1 to 40 microns, said reactive sites being a substituent selected from the group consisting of alkoxy, hydroxyl, halogen, acyloxy, hydrogen, epoxides and alkenyl bound to a silicon atom,
   b. recovering silica flatting agent of step (a), and
   c. aging the silica flatting agent for at least two hours, the agglomerates of said flatting agent having a reduced hydrophilic character over that of the silica pellets and having distributed uniformly thereon the organopolysiloxane - silica reaction product.

7. The process of claim 6, wherein the mill is a fluid energy mill.

8. The process of claim 6 wherein the substituent of the reactive sites is selected from the group consisting of hydrogen, alkoxy, and halogen.

9. The process of claim 6, wherein the reactive sites are hydrogen substituents on silicon atoms.

10. The process of claim 9, wherein the organopolysiloxane is a methyl hydrogen polysiloxane.

11. The process of claim 1, wherein the flatting agent has an agglomerate size distribution of from about 2 to 30 microns.

12. The process of claim 6, wherein the flatting agent has an agglomerate size distribution of from 2 to 30 microns.

13. A coating composition containing the product of the process of claim 1.

14. A coating composition containing the product of the process of claim 3.

15. A coating composition containing the product of the process of claim 4.

16. A coating composition containing the product of the process of claim 5.

17. A coating composition containing the product of the process of claim 11.

* * * * *